US009342828B2

(12) United States Patent
Sanchez et al.

(10) Patent No.: US 9,342,828 B2
(45) **Date of Patent: *May 17, 2016**

(54) SYSTEMS AND METHODS FOR FACILITATING THE APPROVAL AND USE OF A CREDIT ACCOUNT VIA MOBILE COMMERCE

(71) Applicant: FIRST DATA CORPORATION, Greenwood Village, CO (US)

(72) Inventors: J. Scott Sanchez, Atlanta, GA (US); Dominic John Morea, Marietta, GA (US)

(73) Assignee: First Data Corporation, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,979

(22) Filed: May 11, 2015

(65) Prior Publication Data

US 2015/0242839 A1 Aug. 27, 2015

Related U.S. Application Data

(63) Continuation of application No. 14/024,402, filed on Sep. 11, 2013, now Pat. No. 9,047,617.

(60) Provisional application No. 61/699,728, filed on Sep. 11, 2012, provisional application No. 61/799,676, filed on Mar. 15, 2013.

(51) Int. Cl.

*G06Q 20/32* (2012.01)
*G06Q 20/40* (2012.01)
*G06Q 30/02* (2012.01)

(Continued)

(52) U.S. Cl.

CPC ............ *G06Q 20/3223* (2013.01); *G06Q 20/02* (2013.01); *G06Q 20/102* (2013.01); *G06Q 20/204* (2013.01); *G06Q 20/24* (2013.01); *G06Q 20/3224* (2013.01); *G06Q 20/3276* (2013.01); *G06Q 20/3278* (2013.01); *G06Q 20/40* (2013.01); *G06Q 20/4037* (2013.01); *G06Q 20/42* (2013.01); *G06Q 30/0222* (2013.01); *G06Q 30/0233* (2013.01); *G06Q 30/0267* (2013.01); *G06Q 30/0625* (2013.01);

(Continued)

(58) Field of Classification Search

CPC .......... G06Q 20/3223; G06Q 20/3276; G06Q 20/3278; G06Q 20/24; G06Q 40/025

See application file for complete search history.

(56) References Cited

U.S. PATENT DOCUMENTS

| | | | | |
|---|---|---|---|---|
| 9,047,617 | B2 * | 6/2015 | Sanchez et al. | |
| 2007/0124238 | A1 * | 5/2007 | Hogg et al. | 705/38 |

*Primary Examiner* — Kristy A Haupt

(74) *Attorney, Agent, or Firm* — Sutherland Asbill & Brennan LLP

(57) ABSTRACT

A consumer can receive a new credit application at their mobile device. The consumer can complete and electronically transmit the credit application via a mobile application on their mobile device. A transaction processing system can receive the credit application and electronically pass it along to the financial institution issuing the credit for a determination on the credit application. An approval or denial can be electronically received by the transaction processing system from the financial institution. If approved, the transaction processing system can forward the approval along with the new credit account information and a code or other device to allow the consumer to immediately use the new credit account. The mobile device can receive the approval via the mobile application as well as any coupons associated with the new account and can provide the consumer with a mechanism to immediately purchase items with the newly approved credit account.

20 Claims, 6 Drawing Sheets

(51) Int. Cl.

*G06Q 30/06* (2012.01)
*G06Q 20/10* (2012.01)
*G06Q 20/02* (2012.01)
*G06Q 20/20* (2012.01)
*H04L 29/06* (2006.01)
*G06Q 20/24* (2012.01)
*G06Q 20/42* (2012.01)
*G06Q 40/02* (2012.01)

(52) U.S. Cl.

CPC .......... *G06Q30/0633* (2013.01); *G06Q 40/025* (2013.01); *H04L 63/083* (2013.01)

SYSTEMS AND METHODS FOR FACILITATING THE APPROVAL AND USE OF A CREDIT ACCOUNT VIA MOBILE COMMERCE

RELATED APPLICATIONS

This application claims priority to U.S. patent application Ser. No. 14/024,402, titled "Systems and Methods for Facilitating the Approval and Use of a Credit Account Via Mobile Commerce," filed on Sep. 11, 2013, which claims priority to U.S. Provisional Application Ser. No. 61/699,728, titled "Systems and Methods for Implementing Mobile Commerce," filed on Sep. 11, 2012, and to U.S. Provisional Application Ser. No. 61/799,676, titled "Systems and Methods for Implementing Mobile Commerce," filed on Mar. 15, 2013, the entire contents of each of which are hereby incorporated herein by reference for all purposes.

FIELD OF THE DISCLOSURE

The disclosure generally relates to mobile commerce, and more particularly, to systems and methods for facilitating the approval and use of a credit account via mobile commerce.

BACKGROUND

Business owners use many techniques to draw customers to merchant locations and to convince customers to make purchases. One technique is to offer the customer a credit card so that the customer does not need to use cash to make a purchase. The credit card may be a merchant sponsored credit card, one that is used only at merchant locations within that merchant chain, or a credit card that can be used across multiple unaffiliated chains. In addition, merchant owners will typically provide some type of discount or promotion that is tied to the customer filling out a credit card application. The customer will typically fill out a paper application for the credit card at the merchant location. The employee for the merchant at the merchant location will take the application and submit it to the credit card processor. The customer will then learn in a few weeks whether the application has been accepted. In certain situations, the customer may be turned down for the credit card. However, by that time the customer has already received the discount or promotion. In certain instances, the merchant will include in the credit card application the right to withdraw the discount or promotion if the customer is not approved for credit. Further, the customer will typically need to pay for the items purchased under the promotion immediately. Both of these situations are likely to result in a negative view by the customer towards the merchant, even if the merchant is not ultimately responsible for making the determination as to whether to extend credit to the customer.

BRIEF DESCRIPTION OF THE DISCLOSURE

The disclosure relates to systems and methods for facilitating the approval and use of a credit card account via mobile commerce.

In one embodiment, a method may be provided. The method may include a user device comprising one or more processors receiving an application for a credit account. The user device may receive a plurality of data inputs in the application for the credit account. The user device may transmit the application for the credit account comprising the data inputs to an application processing server to facilitate processing of the application. The user device may receive a notification of approval of the application for the credit account. The user device may receive a credit account number associated with the approved application for the credit account while the consumer is in the predefined merchant location. The user device may transmit the credit account number to a merchant system to facilitate a purchase at a merchant location.

In one aspect of an embodiment, the user device generates an indication that a consumer has entered a predefined merchant location. The user device may receive an offer to apply for the credit account.

In one aspect of an embodiment, the user device may scan a code at the merchant location. The user device may receive an offer to apply for the credit account in response to scanning the code. The user device may transmit a request to receive the offer to apply for the credit account. The application for the credit account may be received in response to the transmission of the request by the user device.

In one aspect of an embodiment, the code is one of a bar code and a QR code.

In one aspect of an embodiment, the user device may be positioned adjacent a near-field communication device. The user device may receive an offer to apply for the credit account from the near-field communication device.

In one aspect of an embodiment, the application includes multiple credit application prompts and at least a portion of the multiple data inputs are received in response to at least a portion of the credit application prompts.

In one aspect of an embodiment, the user device may store the credit account number as a payment method on the user device.

In one aspect of an embodiment, the user device may display the notification of approval and the credit account number on a display of the user device. The notification of approval may be received by the user device within about one minute after the application is transmitted to the application processing server.

In one aspect of an embodiment, the user device may receive a coupon associated with the receipt of the credit account number. The user device may transmit the coupon to the merchant system to facilitate the application of the coupon to the purchase at the merchant location.

In one aspect of an embodiment, the user device may receive a credit card bill associated with the credit account number. The user device may display at least one bill-pay option on the display of the user device. The user device may receive a selection of one of the bill-pay options. The user device may transmit the credit card bill and the selected bill-pay option for payment. The user device may receive a payment notification at the display of the user device notifying that the payment was accepted.

In one embodiment a system is provided. The system may include at least one memory storing computer-executable instructions; and at least one processor, wherein the at least one processor may be configured to access the at least one memory and to execute the computer-executable instructions to receive an application for a credit account; receive a plurality of data inputs in the application for the credit account; direct communication of the application for the credit account comprising the data inputs to an application processing server to facilitate processing of the application; receive a notification of approval of the application for the credit account; receive a credit account number associated with the approved application for the credit account while the consumer is in the predefined merchant location; and direct communication of the credit account number to a merchant system to facilitate a purchase at a merchant location.

In one aspect of an embodiment, the user device generates an indication that a consumer has entered a predefined merchant location. The user device may receive an offer to apply for the credit account.

In one aspect of an embodiment, the at least one processor is further configured to execute the computer-executable instructions to scan a code at the merchant location; receive an offer to apply for the credit account in response to scanning the code; and direct communication of a request to receive the offer to apply for the credit account. The application for the credit account may be received in response to directing the communication of the request.

In one aspect of an embodiment, the code is one of a bar code and a QR code.

In one aspect of an embodiment, the user device may be positioned adjacent a near-field communication device and the at least one processor is further configured to execute the computer-executable instructions to receive an offer to apply for the credit account from the near-field communication device.

In one aspect of an embodiment, the application includes multiple credit application prompts and at least a portion of the multiple data inputs are received in response to at least a portion of the credit application prompts.

In one aspect of an embodiment, the at least one processor is further configured to execute the computer-executable instructions to store the credit account number as a payment method on the user device.

In one aspect of an embodiment, the at least one processor is further configured to execute the computer-executable instructions to display the notification of approval and the credit account number on a display of the user device. The notification of approval may be received by the user device within about one minute after the application is transmitted to the application processing server.

In one aspect of an embodiment, the at least one processor is further configured to execute the computer-executable instructions to receive a coupon associated with the receipt of the credit account number; and direct communication of the coupon to the merchant system to facilitate the application of the coupon to the purchase at the merchant location.

In one aspect of an embodiment, the at least one processor is further configured to execute the computer-executable instructions to receive a credit card bill associated with the credit account number; display at least one bill-pay option on the display of the user device; receive a selection of one of the bill-pay options; direct communication of the credit card bill and the selected bill-pay option for payment; and receive a payment notification at the display of the user device notifying that the payment was accepted.

BRIEF DESCRIPTION OF THE DRAWINGS

Reference will now be made to the accompanying drawings, which are not necessarily drawn to scale, and wherein.

DETAILED DESCRIPTION

Figure 1:
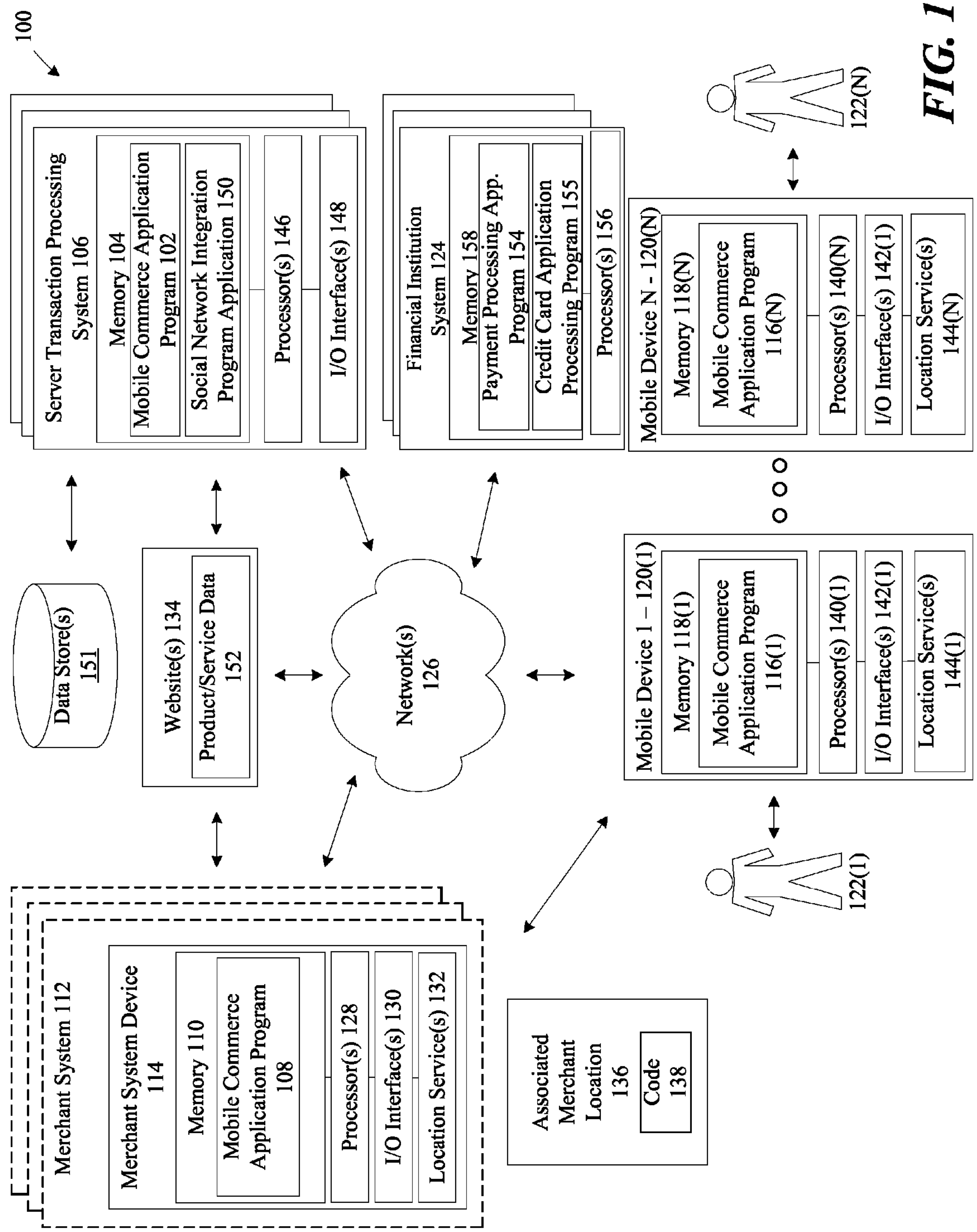
FIG. 1 illustrates an example system for implementing mobile commerce to improve the speed of approving, activating and implementing a customer credit account for a merchant according to certain example embodiments of the disclosure.

The present disclosure is directed to systems and methods for approving, activating and implementing a credit account via mobile commerce. The present disclosure is also directed to systems and methods for receiving and paying a credit card bill via mobile commerce. Certain embodiments of the disclosure will now be described more fully hereinafter with accompanying drawings and corresponding description in FIGS. 1-6. This disclosure may, however, be embodied in many different forms and should not be construed as limited to the embodiments set forth herein.

Overview

The present disclosure relates to systems and methods for approving, activating, and implementing a credit account via mobile commerce and receiving and paying a credit card account using a mobile device via mobile commerce. In one implementation, a mobile commerce application program, also known as a mobile wallet or wallet app, can be downloaded or other otherwise implemented by a consumer and/or merchant via a mobile device or client device, such as a smartphone, cellphone, or tablet computer. The mobile commerce application program can integrate both payment and credit application functionality for use by merchants and consumers to facilitate payment and/or apply for credit cards for one or more merchants. In one example implementation, a geolocation device can receive notification of or determine that a consumer has entered or is near a merchant location, and a credit card offer and associated discount or promotion can be transmitted to the consumer's mobile device or client device (hereinafter collectively the mobile device), such as a smartphone, cellphone or tablet computer. A response can be received from the consumer's mobile device to obtain the offer and the credit card application can be transmitted to be downloaded at the consumer's mobile device. The consumer can fill out the credit card application on their mobile device and submit it electronically for approval. The credit card application can be received and/or transmitted to an issuing bank managing the credit card program for approval or denial. The notification of approval or denial can be received from the issuing bank and can be transmitted to the consumer's mobile device along with the new credit card account information, if any, for the consumer. The credit card account information can also be stored automatically on the consumer's mobile device as a payment method for the consumer. After the consumer has selected one or more goods for purchase, the consumer, using a mobile commerce application program, also known as a mobile wallet or wallet app that has been downloaded or other otherwise implemented by a consumer and/or merchant via the mobile device, can transmit a payment request along with the new credit card account information to a point of sale (POS) device at the merchant location. The discount or promotional offer associated with the credit application can be applied to the consumer's purchase at the merchant POS device.

In another example implementation, a consumer can enter a merchant location and select one or more goods for purchase. The consumer can scan a QR code or similar one-dimensional or two-dimensional code using the consumer's mobile device. Upon scanning the QR code, an offer to apply for a credit card can be transmitted to the consumer's mobile device along with any discount or promotion associated with the credit application offer. A response can be received from the consumer's mobile device to obtain the offer and the credit card application can be transmitted to and downloaded at the consumer's mobile device. The consumer can fill out the credit card application on their mobile device and submit it electronically for approval. The credit card application can be transmitted to an issuing bank managing the credit card program for approval or denial of the credit account. The notification of approval or denial can be received from the issuing bank and can be transmitted to the consumer's mobile device along with the new credit card account information for the consumer. The credit card account information can also be stored on the consumer's mobile device as a payment method for the consumer. Using a mobile commerce application program, also known as a mobile wallet or wallet app that has been downloaded or other otherwise implemented by a consumer and/or merchant via the mobile device, the consumer can transmit a payment request along with the new credit card account information to a point of sale (POS) device at the merchant location. The discount or promotional offer associated with the credit application can be applied to the consumer's purchase at the merchant POS device.

In yet another example implementation, a consumer can enter a merchant location and select one or more goods for purchase. An indication can be received that the consumer is within a certain distance of a near-field communication (NFC) device at the merchant location. In certain example embodiments, the determination can be caused by the consumer placing their mobile device near an NFC device. Once the consumer's mobile device is within range of the merchant's NFC device, an offer to apply for a credit card can be transmitted to the consumer's mobile device along with any discount or promotion associated with the credit application offer. A response can be received from the consumer's mobile device to obtain the offer and the credit card application can be transmitted to and downloaded at the consumer's mobile device. The consumer can fill out the credit card application on their mobile device and submit it electronically for approval. The credit card application can be transmitted to an issuing bank managing the credit card program for approval or denial of the credit account. The notification of approval or denial can be received from the issuing bank and can be transmitted to the consumer's mobile device along with the new credit card account information for the consumer. The credit card account information can also be stored on the consumer's mobile device as a payment method for the consumer. Using a mobile commerce application program, also known as a mobile wallet or wallet app that has been downloaded or other otherwise implemented by a consumer and/or merchant via the mobile device, the consumer can transmit a payment request along with the new credit card account information to a point of sale (POS) device at the merchant location. The discount or promotional offer associated with the credit application can be applied to the consumer's purchase at the merchant POS device.

In still another example implementation, a mobile commerce application program can be downloaded or other otherwise implemented by a consumer via the consumer's mobile device. Once a credit card bill for the consumer is generated, such as by the credit card issuing bank or a third-party handling the generation of bills for the issuing bank, the credit card bill can be transmitted to the consumer's mobile device, either via the mobile app or as an email to an email account of the consumer. The mobile commerce application can be launched and can display the bill for the consumer on the display of the mobile device. The consumer can transmit a request to pay the bill and bill-pay options can be determined and transmitted to the mobile commerce application for display on the consumer's mobile device. Via the mobile commerce application, the consumer can select the bill payment option to use for paying the credit card bill and the selected bill payment option along with the bill can be transmitted by the mobile commerce application via the server to the issuing bank or associated third party for payment. The server can receive a notification of successful payment from the issuing bank or associated third party and can transmit the notification to the consumer's mobile device for display via the mobile commerce application.

In the above implementations and other embodiments described herein, a mobile commerce application program, sometimes referred to as a wallet app, can be hosted or otherwise stored on a mobile device, client device, server device, or any other processor-based device. Multiple instances of mobile commerce application programs can operate within a network environment, such as described in FIG. 1, and each may have similar or different functionality, such as described in FIG. 2, according to various embodiments and implementations as described herein.

Certain Example Implementations and Embodiments

An example architecture or environment for a system 100 according to various example embodiments of the disclosure is shown in and described with respect to FIG. 1. A mobile commerce application program or module, such as 102, can be stored in memory 104 at a server device 106. In certain embodiments, a mobile commerce application program or module, such as 108, can be stored in memory 110 at a merchant system computer 112 or associated merchant device 114. In certain embodiments, a mobile commerce application program or module, such as 116(1), can be stored in memory 118(1) at a mobile device 120(1) associated with a consumer 122(1) or user. In any instance, one or more mobile commerce application programs or modules operating on respective computers, servers and/or mobile devices can implement some or all of the functionality described herein.

As shown in FIG. 1, the system 100 may include or otherwise support one or more merchant system computers 112 and/or associated merchant devices 114, one or more consumer or mobile devices 120(1)-120(N), one or more server transaction processing systems 106, and one or more issuer or financial institution systems 124. A wide variety of different types of consumer or mobile devices 120(1)-120(N) may be provided or otherwise supported, such as consumer computers and/or mobile communication devices. As desired, the system 100 may provide or otherwise support a wide variety of other entities associated with payment transactions, such as one or more server transaction processing systems 106. Any number of suitable networks and/or communication channels, such as the illustrated networks 126, may facilitate communication between various components of the system 100.

With reference to FIG. 1, any number of merchant system computers 112 and/or associated merchant devices 114 may be provided or otherwise supported. In certain example embodiments, these merchant system computers 112 and/or associated merchant devices 114 may include one or more point-of-sale (POS) devices or terminals. As desired, each merchant system computer 112 and/or associated merchant device 114 may include any number of processor-driven devices, including but not limited to, a server computer, a mainframe computer, one or more networked computers, a desktop computer, a personal computer, a laptop computer, a mobile computer, a smartphone, a tablet computer, a wearable computer device, an application-specific circuit, or any other processor-based device.

A merchant system computer 112 and/or associated merchant device 114 may be any suitable device that facilitates purchase transactions, such as those in retail establishments, e-commerce and/or mobile transactions. In operation, the merchant system computer 112 and/or associated merchant device 114 may utilize one or more processors 128 to execute computer-readable instructions that facilitate the hosting of one or more mobile commerce application program services, the receipt of purchase transaction requests, and/or the processing of credit-card application requests. As a result of executing these computer-readable instructions, a special purpose computer or particular machine may be formed that facilitates product purchase transactions and/or credit card application determinations.

In addition to having one or more processors 128, the merchant system computer 112 and/or associated merchant device 114 may further include and/or be associated with one or more memory devices 110, input/output ("I/O") interface(s) 130, network interface(s), and/or location services 132. The memory 110 may be any computer-readable medium, coupled to the processor(s) 128, such as random access memory ("RAM"), read-only memory ("ROM"), and/or removable storage devices. The memory 110 may store a wide variety of data files and/or various program modules, such as an operating system ("OS"), one or more host modules, and/or one or more transaction modules or transaction applications, such as mobile commerce application program 108. The data files may include any suitable data that facilitates the operation of the merchant system computer 112 and/or associated merchant device 114, and/or interaction of the merchant system computer 112 and/or associated merchant device 114 with one or more other components (e.g., one or more consumer or mobile devices 120(1)-120(N), one or more server transaction processing systems 106, one or more merchant acquiring platforms, one or more issuer systems, one or more financial institution systems 124, etc.) of the system 100. For example, the data files may include information associated with one or more websites 134 (hosted by either a third party and/or merchant), webpages, inventory information associated with available products, acquiring platform information, service provider information, information associated with the generation of payment transactions, information associated with the generation and routing of credit card applications from consumers, and/or routing information for payment transactions and/or credit card application transactions.

The OS may be any suitable module that facilitates the general operation of the merchant system computer, as well as the execution of other program modules. For example, the OS may be any currently known or future developed operating system including, but not limited to, Microsoft Windows®, Apple OSX™, Unix, a mainframe computer operating system (e.g., IBM z/OS, MVS, OS/390, etc.), or a specially designed operating system. The host modules may include any number of suitable host modules that manage interactions and communications between the merchant system computer 112 and/or associated merchant device 114, and one or more external devices, such as the consumer or mobile devices 120(1)-120(N). For example, the host modules may include one or more Web server modules that facilitate the hosting of merchant websites and/or third party websites, such as 134, webpages, and/or transaction processing webpages. As another example, the host modules may include one or more cellular modules and/or systems that facilitate cellular communication with one or more mobile devices 120(1)-120(N).

The transaction modules or applications, such as the mobile commerce application program 108, may include any number of suitable software modules and/or applications that facilitate the collection and/or processing of information associated with a purchase transaction, such as one or more identifiers of desired products (e.g., UPC identifiers) and/or services, a desired payment account, a desired type of transaction (e.g., a card present transaction, a card not present transaction, etc.), consumer identification information, and/or an identifier of a consumer or mobile device 120(1)-120(N) (e.g., a mobile device identifier, etc.). Based at least in part upon the collected information, the transaction modules or applications may generate and/or communicate a wide variety of transaction-related requests, such as payment processing and/or authorization requests and/or credit card application and account information. One example of the operations that may be performed by a transaction module or mobile commerce application program 108 and/or the merchant system computer 112 and/or associated merchant device 114 is described in greater detail below with reference to FIG. 2.

With continued reference to the merchant system computer 112 and/or associated merchant device 114, the one or more I/O interfaces 130 may facilitate communication between the merchant system computer 112 and/or associated merchant device 114 and one or more input/output devices; for example, one or more user interface devices, such as a display, a keypad, a mouse, a pointing device, a gesture detection device, an eye movement detection device, a control panel, a touch screen display, a remote control, a microphone, a speaker, a consumer device reader, etc., that facilitate user interaction with the merchant system computer 112 and/or associated merchant device 114. The one or more network interfaces may facilitate connection of the merchant system computer 112 and/or associated merchant device 114 to one or more suitable networks, such as 126, and/or communication links. In this regard, the merchant system computer 112 and/or associated merchant device 114 may receive and/or communicate information to other components of the system 100, such as the consumer or mobile devices, for example 120(1)-120(N), the server transaction processing systems 106, and/or the issuer or financial institution systems 124.

In certain example embodiments, a merchant system computer 112 and/or associated merchant device 114 can be associated with a merchant location 136, such as a retail store or "bricks and mortar"-type establishment. The merchant location 136 may include a code 138, such as a QR code, bar code, or other machine readable code, wherein consumers can utilize a respective consumer or mobile device 120(1)-120(N) to scan or read the code to obtain information associated with a merchant, such as a merchant credit card application and program.

Additionally, with continued reference to FIG. 1, any number of consumer or mobile devices 120(1)-120(N) may be provided or otherwise supported. Examples of suitable consumer or mobile devices can include, but are not limited to, personal computers and/or mobile communication devices (e.g., mobile phones, smart phones, etc.), etc. According to one example aspect of the disclosure, a consumer or mobile device, such as 120(1) may be a suitable device that is capable of interaction with other components of the system 100 during the request and/or completion of an e-commerce transaction. For example, a personal computer or mobile device may be utilized to access one or more e-commerce websites, such as 134, including those hosted by the merchant system computer, such as 112, identify products and/or services to be purchased, request a purchase and/or credit card application, and/or interact with the merchant system computer 112, merchant system device 114, and/or other components of the system 100 (e.g., the server transaction processing system 106, etc.) during the completion of a payment and/or credit card application transaction. In one example embodiment, a mobile device, such as 120(1), may be utilized to request a payment transaction and/or credit card application and/or to provide validation information during the processing of the payment transaction. In another example embodiment, a personal computer may be utilized to request a payment transaction and/or credit card application, and communication may be established with a mobile device, such as 120(1), in order to facilitate provision of validation information.

As desired, a consumer or mobile device, such as 120(1), may be any number of processor-driven devices including, but not limited to, a personal computer, a mobile computer, an application-specific circuit, a minicomputer, a microcontroller, and/or any other processor-based device. The components of an example mobile device, such as 120(1), will now be described in greater detail, and it will be appreciated that a personal computer may include similar components. With reference to the mobile device 120(1), the mobile device 120(1) may utilize one or more processors 140(1) to execute computer-readable instructions that facilitate the general operation of the mobile device 120(1) (e.g., call functionality, etc.) and/or communication with a merchant system computer 112, merchant system device 114, and/or other components of the system 100 (e.g., the server transaction processing system 106) for payment transaction and/or credit card application purposes. As a result of executing these computer-readable instructions, a special purpose computer or particular machine may be formed that facilitates the completion of payment transactions and/or credit card applications.

In addition to having one or more processors, the mobile device, such as 120(1)-120(N), may further include and/or be associated with one or more memory devices 118(1)-118(N), input/output ("I/O") interfaces 142(1)-142(N), network interfaces, and/or location services 144(1)-144(N). The memory 118(1)-118(N) may be any computer-readable medium, coupled to the one or more processors 140(1)-140(N), such as random access memory ("RAM"), read-only memory ("ROM"), and/or removable storage devices. The memory 118(1)-118(N) may store a wide variety of data files and/or various program modules, such as an operating system ("OS") and/or one or more transaction modules or applications, such as a mobile commerce application program 116(1)-116(N). In certain example embodiments, a mobile device, such as 120(1), may include one or more secure elements configured to securely store and/or access information, such as payment applications, payment account information, validation information (e.g., a stored mPIN, etc.), encryption information, and/or other transaction-related information. The secure elements may be stored in the memory 118(1) and/or included as a separate component of the mobile device 120(1). For example, a secure element may be a separate chip that is configured to communicate with primary computing functionality for the mobile device. As desired, one or more of the transaction modules, such as the mobile commerce application program 116(1), may be stored on a secure element. The transaction modules may be invoked by other components of the mobile device 120(1) and/or by one or more other components of the system 100, such as the merchant system computer 112, merchant system device 114, and/or the server transaction processing system 106.

The data files may include any suitable data that facilitates the operation of the mobile device, such as 120(1), and/or interaction of the mobile device 120(1) with one or more other components (e.g., a merchant system computer 112, merchant system device 114, a server transaction processing system 106, etc.) of the system 100. For example, the data files may include information associated with accessing the secure elements, information associated with invoking transaction modules, and/or information associated with accessing and/or processing validation data (e.g., an mPIN, etc.). The OS may be a suitable module that facilitates the general operation of the mobile device, such as 120(1), as well as the execution of other program modules. For example, the OS may be any currently known or future developed operating system including, but not limited to, a suitable mobile OS or a specially designed operating system. As desired, the mobile device 120(1) may also include one or more suitable browser applications that facilitate the access of one or more webpages hosted by the merchant system computer 112, and/or third party or merchant websites, such as 134.

The transaction modules may include one or more suitable software modules and/or applications configured to facilitate purchase transactions, such as payment transactions and/or credit card applications, on behalf of the mobile device, such as 120(1). In certain embodiments, a transaction module or mobile commerce application program, such as 116(1), may also facilitate communication with a server transaction processing system, such as 106, or a trusted service manager. A wide variety of suitable techniques may be utilized to install a transaction module on the mobile device, such as 120(1). For example, a transaction module may be provisioned to the mobile device 120(1) by a server transaction processing system 106 and/or by an issuer or financial institution system 124. Additionally, during the installation and/or registration of the transaction module, a wide variety of validation information may be generated and/or identified. For example, a consumer, such as 122(1) may be prompted to enter an mPIN, such as a multi-character and/or multi-numeral code, to an associated mobile device, such as 120(1). As desired, the mPIN may be stored on a secure element. Additionally, the mPIN and/or a wide variety of information derived from the mPIN (e.g., an encrypted mPIN, etc.) may be provided to one or more issuer or financial institution systems, such as 124, or an issuer system associated with an issuer of a payment account (e.g., a credit account, a debit account, a stored value account, etc.) that is associated with the transaction module.

According to an aspect of the disclosure, following registration and/or activation of the transaction module, the transaction module may be invoked during a payment transaction and/or credit card application. For example, the transaction module may be invoked by a merchant system computer 112, merchant system device 114, or by a server transaction processing system 106 at the request of the merchant system computer 112 and/or merchant system device 114. In certain embodiments, the transaction module may be invoked following a consumer request to conduct a payment transaction and/or to receive and submit a credit card application and the identification of the mobile device, such as 120(1), by the merchant system computer 112, merchant system device 114, or server transaction processing system 106. Following the invocation of the transaction module, a request for validation data and/or payment transaction data and/or credit card application data may be received. As desired, the transaction module may prompt the consumer for entry of an mPIN, and an mPIN value entered by the consumer, such as 122(1), (e.g., by a keypad, touchscreen, etc.) may be identified. A stored mPIN value may then be accessed from the secure element and compared to the entered mPIN value. In this regard, the entered mPIN value may be authenticated. If the entered mPIN value is not authenticated, then the transaction module may reject a proposed transaction and direct the output of a suitable error message.

If, however, the entered mPIN value is authenticated, then the transaction module may provide payment account data and/or credit card application data and associated validation data to the merchant system computer 112, merchant system device 114, or server transaction processing system 106. A wide variety of different types of validation data may be provided as desired in various embodiments including, but not limited to, an mPIN entered by the consumer 122(1), an indication that the entered mPIN was authenticated by the mobile device 120(1) and/or the secure element, an encrypted version of the entered mPIN, and/or an encrypted version of the stored mPIN. In one example embodiment, an entered mPIN may be authenticated, encrypted, and provided to the merchant system computer (or a server transaction processing system). In this regard, the encrypted mPIN may be provided to the issuer or financial institution system, such as 124, for authentication and/or risk analysis purposes.

Examples of the operations of the transaction module and/or the mobile device are described in greater detail below with reference to the other figures.

The one or more I/O interfaces, such as 142(1)-142(N), may facilitate communication between the mobile device, such as 120(1) and one or more input/output devices; for example, one or more user interface devices, such as a display, a keypad, a touch screen display, a microphone, a speaker, etc., that facilitate user interaction with the mobile device 120(1). Further, the one or more network interfaces may facilitate connection of the mobile device, such as 120 (1), to one or more suitable networks, for example, the network(s) 126 illustrated in FIG. 1. In this regard, the mobile device, such as 120(1), may receive and/or communicate information to other components of the system 100.

With continued reference to FIG. 1, as desired in various embodiments, any number of server transaction processing systems, such as 106, may be provided or otherwise supported. A server transaction processing system 106 may facilitate the backend processing of a purchase transaction, such as a payment transaction, and/or the receipt and processing of a credit card application and the issuance of a credit or debit card in response thereto. In certain example embodiments, an issuer system may include similar components as those discussed above for the merchant system computer 112 and/or merchant system device 114. For example, server transaction processing system 106 may include any number of processors 146, memories, I/O interfaces 148, and/or network interfaces. In certain example embodiments, a server transaction processing system 106 can include one or more transaction modules, such as a mobile commerce application program 102 and/or a social network integration program application 150. In any instance, the transaction modules can facilitate communications and/or interactions with any number of consumer or mobile devices such as 120(1)-120(N), merchant computer systems such as 112, merchant system devices 114, data stores 151, third party websites such as 134, and financial institution systems such as 124. In certain embodiments, a server transaction processing system, such as 106, can host a social network integration program application, such as 150, configured to communicate via any number of social network services and/or websites to obtain information from the services and/or websites, for example, product and/or service data 152 on a third party or merchant website, such as 134.

Furthermore, as desired, a server transaction processing system, such as 106, may provide a wide variety of transaction module provisioning services. Additionally, a server transaction processing system, such as 106, may provide a wide variety of transaction-related and/or value added services ("VAS") in association with transactions, such as credit card application services, coupon redemption services, loyalty/reward services, location-based services, electronic receipt services, product registration services, warranty services, coupon issuance services, and/or the routing of a proposed transaction to an issuer for approval and/or settlement purposes. In certain example embodiments, a server transaction processing system, such as 106, may include similar components as those discussed above for the merchant system computer, such as 112, and/or merchant system device, such as 114. For example, a server transaction processing system, such as 106, may include any number of processors, memories, I/O interfaces, and/or network interfaces.

With continued reference to FIG. 1, as desired in various example embodiments, any number of issuer or financial institution systems, such as 124, may be provided or otherwise supported. An issuer or financial institution system, such as 124, may facilitate the backend processing of payment transactions and/or credit card application evaluations and determinations. For example, an issuer or financial institution system, such as 124, may host a payment processing application program, such as 154, or module to facilitate the approval, authentication, and/or settlement of a payment transaction. In certain example embodiments, a payment transaction may be routed to an issuer or financial institution system, such as 124, via a suitable transaction network (e.g., a debit network, a credit network, etc.), and the issuer or financial institution system, such as 124, may evaluate the payment transaction via the payment processing application program, such as 154, or module. An approval or rejection of the payment transaction may then be output for communication to a merchant system computer, such as 112, and/or merchant system device 114. The issuer or financial institution system, such as 124, may then facilitate the settlement of the payment transaction.

In another example, an issuer or financial institution system, such as 124, may host a credit card application processing program, such as 155, or module to facilitate the evaluation, approval and/or denial of a received credit card application from a consumer via the mobile device (120(1). In certain example embodiments, a credit card application may be routed to an issuer or financial institution system, such as 124, via a suitable transaction network (e.g., a debit network, a credit network, etc.), and the issuer or financial institution system, such as 124, may evaluate the credit card application via the credit card application processing program, such as 155, or module. An approval or denial of a credit account and credit card associated with the credit card application along with any new account number and account details (if the application is approved) may then be output for communication to the consumer mobile device 120(1). The consumer via the mobile device 120(1) may then institute a purchase transaction using the new account information for the approved credit account.

In certain example embodiments, an issuer or financial institution system, such as 124, may include similar components as those discussed above for the merchant system computer 112 and/or merchant system device 114. For example, an issuer or financial institution system, such as 124, may include any number of processors 156, memories 158, I/O interfaces 160, and/or network interfaces.

In certain embodiments of the disclosure, an issuer or financial institution system, such as 124, may receive validation information in association with a purchase transaction and/or credit card application.

A wide variety of suitable networks, individually and/or collectively shown as 126 in FIG. 1, may be utilized in association with embodiments of the disclosure. Certain networks may facilitate use of a wide variety of e-commerce-related communication. For example, one or more telecommunication networks, cellular networks, wide area networks (e.g., the Internet), and/or other networks may be provided or otherwise supported. Other networks may facilitate communication of transaction-related communications. For example, one or more transaction networks, such as branded networks (e.g., a VISA network, etc.), debit and/or PIN networks, and/or a wide variety of other suitable transaction networks may facilitate communication of transaction-related communications, such as e-commerce transactions. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration.

Figure 2:
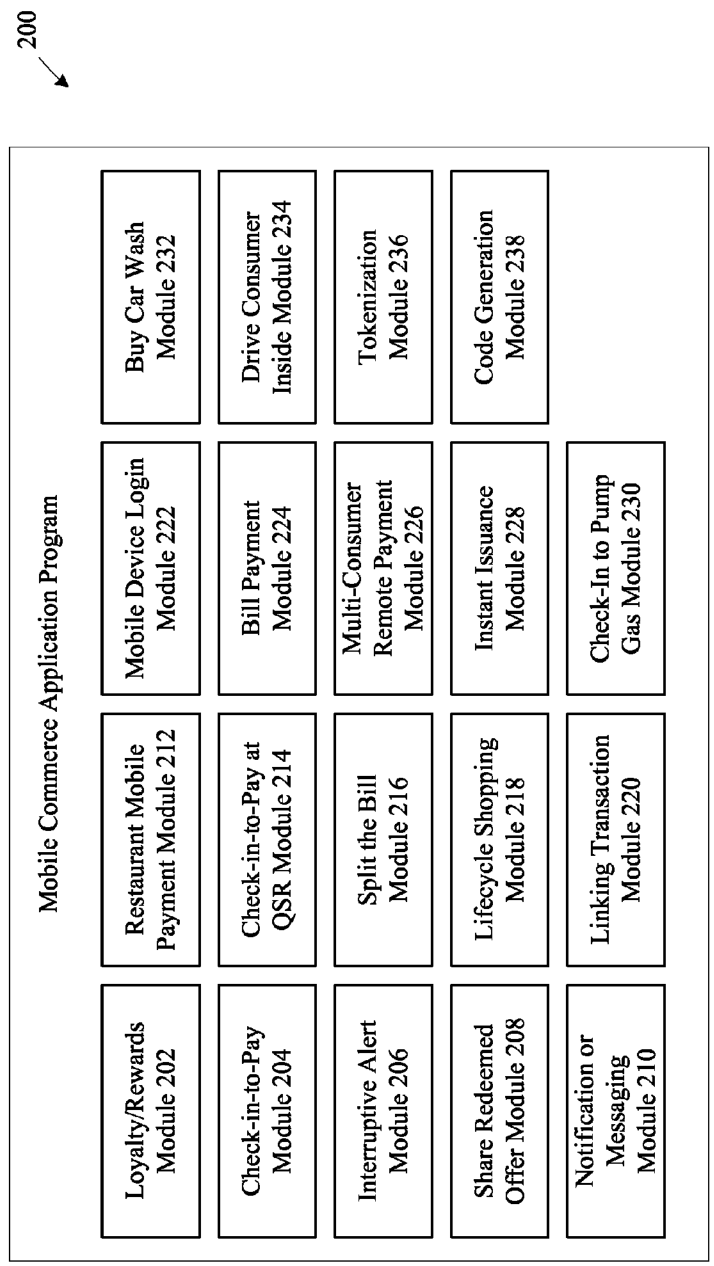
FIG. 2 illustrates an example mobile commerce application program or module for implementing mobile commerce to improve the speed of approving, activating and implementing a customer credit account for a merchant according to certain example embodiments of the disclosure.

FIG. 2 shows an example mobile commerce application program 200, similar to the mobile commerce application programs 102, 108, and 116(1)-116(N) in FIG. 1, that can operate with respect to the system 100 shown in FIG. 1. The mobile commerce application program 200 shown in FIG. 2 can include, for example, a loyalty/rewards module 202, a check-in-to-pay module 204, an interruptive alert module 206, a share redeemed offer module 208, a notification or messaging module 210, a restaurant mobile payment module 212, a check-in-to-pay at QSR module 214, a split the bill module 216, a lifecycle shopping module 218, a linking transaction module 220, a mobile device login module 222, a bill payment module 224, a multi-consumer remote payment module 226, an instant issuance module 228, a check-in to pump gas module 230, a buy car wash module 232, a drive consumer inside module 234, a tokenization module 236, and a code generation module 238. Some or all of the modules 202-238 are described herein with respect to certain mobile commerce functionality, associated processes, and features. FIGS. 3-6 illustrate certain processes associated with some or all of the modules comprising the example mobile commerce application program 200 in FIG. 2.

While the various modules 202-238 are shown by way of example, fewer or greater numbers of modules can be present in various embodiments of a mobile commerce application program. Furthermore, various functionality described with respect to one module may be performed by multiple modules in other embodiments of the disclosure.

Figure 3:
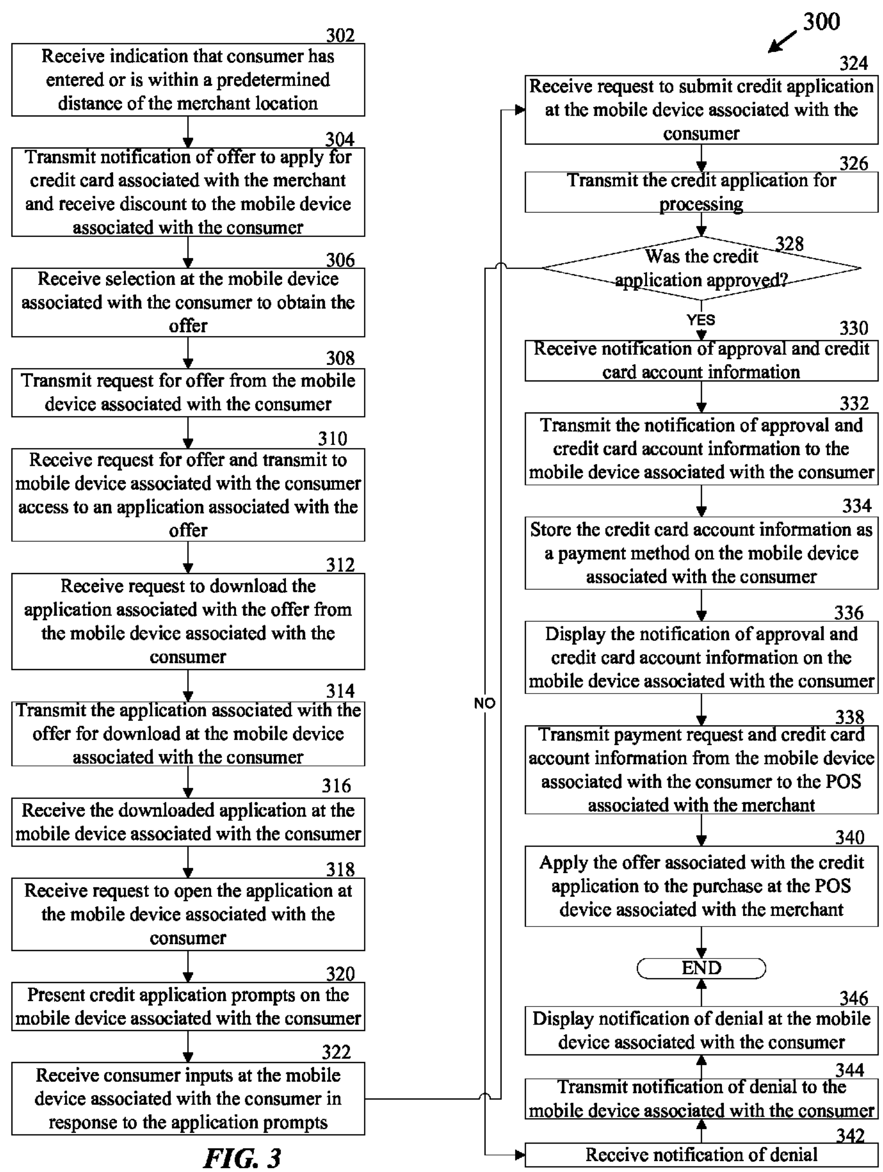
FIG. 3 is a flow chart illustrating an example method for implementing mobile commerce to improve the speed of approving, activating and implementing a customer credit account for a merchant according to certain example embodiments of the disclosure.
Figure 4:
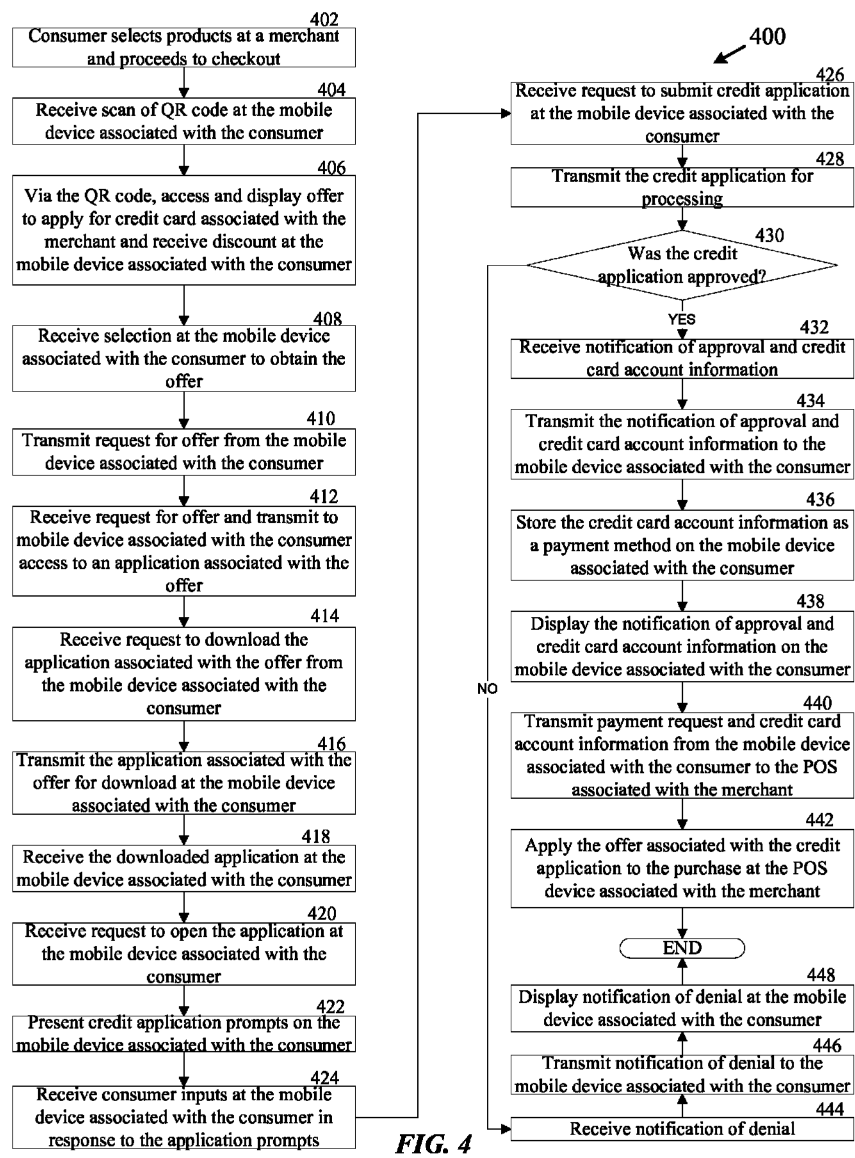
FIG. 4 is a flow chart illustrating another example method for implementing mobile commerce to improve the speed of approving, activating and implementing a customer credit account for a merchant according to an alternate example embodiment of the disclosure.
Figure 5:
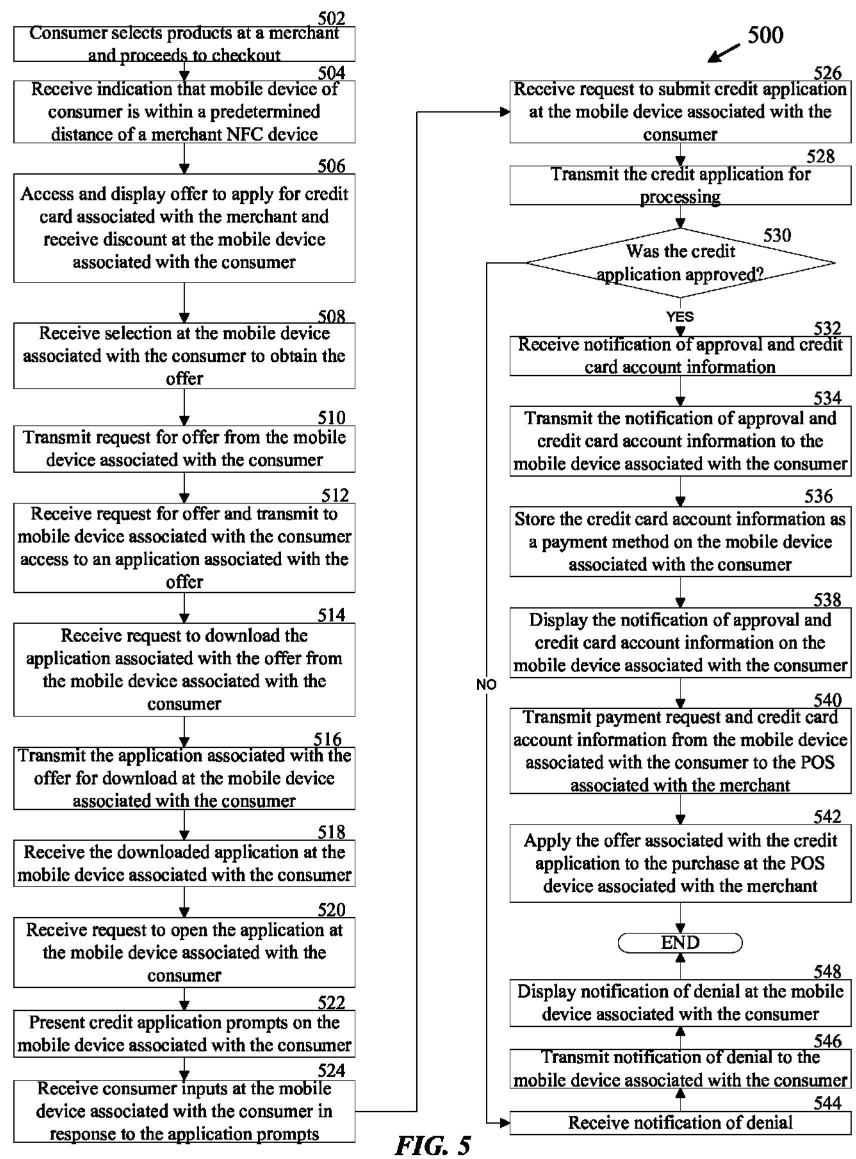
FIG. 5 is a flow chart illustrating yet another example method for implementing mobile commerce to improve the speed of approving, activating and implementing a customer credit account for a merchant according to another alternate example embodiment of the disclosure.

FIGS. 3-5 are directed to example methods 300, 400, 500, and 600 for implementing mobile commerce to improve the speed of approving, activating, and implementing a customer credit account for a merchant according to certain example embodiments of the disclosure. In some instances, consumers want to immediately take advantage of an offer provided to those who complete some sort of registration requirement with a merchant, such as applying for a credit card. Certain example embodiments of the disclosure can provide systems and processes for using a mobile device 120(1)-120(N) to apply for and receive a credit card account from a merchant or third-party associated with the merchant. For example, FIGS. 3-5 illustrate example methods 300, 400, 500, and 600 for applying for and receiving approval for a credit account and receiving account information at a merchant location according to certain embodiments of the disclosure. Various operations of the methods described below can be performed by the system components described above and shown in FIGS. 1 and 2

FIG. 3 is a flow chart illustrating an example method for implementing mobile commerce to improve the speed of approving, activating, and implementing a customer credit account for a merchant according to certain example embodiments of the disclosure. Referring now to FIGS. 1-3, the example method 300 can begin at block 302 by receiving an indication that the consumer has entered or is within a predetermined distance of the merchant location. For example, the location service 132 of the merchant system 112 can determine based on a signal received from the location service 144 of the consumer mobile device 120 that the consumer is at or near the merchant location. In response the processor 140 of the consumer mobile device 120 can automatically launch the instant issuance module 228 of the mobile commerce application program 102, 108, or 116. In block 304, either the mobile commerce application program 102 or 108 can transmit a notification of offer to apply for a credit card. In certain embodiments, the credit card is associated with the merchant. In addition, in certain embodiments, the consumer will receive a discount, such as a predetermined amount or percentage off of the customer's current or future purchase from this merchant or another merchant, or other offer or promotion in response to applying for the credit card. In certain embodiments, the offer will be received at the mobile device 120 via the instant issuance module 228.

In another example, the consumer goes shopping at the merchant's location, for example a conventional brick-and-mortar store. The consumer selects one or more items for purchase from the merchant and proceeds to the check-out area for the merchant. Either previously, or while at the check-out area, the consumer is informed that the merchant is offering its customers the opportunity to apply for a credit card account. For example, the offer can be for a private-label credit card. The consumer can be informed by signage inside or outside of the store, at the check-out area or by being told about the offer by an employee or other customer of the merchant. In certain embodiments, the customer may receive a predefined amount or percentage discount off the customer's current or future purchase from the current or a future merchant.

In another alternative embodiment, the credit card offer can be initiated by the consumer inputting at the I/O interface 142 of the consumer mobile device 120 an identifying code or name associated with the merchant's payment program into a mobile application store or website accessed via the consumer mobile device 120 via the network 126. The consumer mobile device 120 or other client device can communicate with the server mobile commerce application program 102, via the network 126, some or all information associated with the code or name input by the consumer.

In block 306, the consumer mobile device 120 can receive a selection to obtain the offer. For example, the consumer can input via the I/O interface 142 of the consumer mobile device 120 an acceptance of the offer by depressing the portion of the touch-screen display of consumer mobile device 120 provided with an "accept" radio button. In block 308, the selection or request for the offer can be transmitted from the consumer mobile device 120 to the server 106 via the network 126. The server 106 can receive the request in block 310 and transmit from the server 106 to the consumer mobile device 120 access to an application associated with the offer. For example, the server 106, via the mobile commerce application program 102, can provide the instant issuance module 228, or access thereto, for downloading at the mobile commerce application program 116 of the mobile device 120.

In block 314, the server 106 can transmit the credit card application associated with the offer to the consumer mobile device 120 via the network 126. For example, the server 106 can identify the merchant's mobile payment program and instant issuance module 228, and download, via the network 126, the instant issuance module 228 to the consumer mobile device 120 or other client device. In certain example embodiments, the server 106 identifies the instant issuance module 228 for the particular merchant based on the identified location of the consumer mobile device 120, as provided by the location service 144, the code (e.g., QR code, bar code, alphanumeric code or any other one or two-dimensional code) displayed at the merchant, or the information provided by near-field communication.

The downloadable credit card application is received at the consumer mobile device 120 via the mobile commerce application program 116 in block 316. For example, the instant issuance module 228 can be received and stored in memory 118 of the mobile device 120. In block 318, a request can be received to open the mobile commerce application program 116 the mobile device 120. In certain example embodiments, the request can be automatic in response to completing the download. Alternatively, the consumer can receive a display of an icon associated with the mobile commerce application program 116 and can select the icon on the I/O interface 142 to launch or open the mobile commerce application program 116. In block 320, credit application prompts are presented on the consumer mobile device 120 by the mobile commerce application program 116. For example, the instant issuance module 228 of the mobile commerce application program 116 can generate and display on the consumer mobile device 120 one or more prompts associated with applying for a credit card or similar product. These prompts can include, for example, radio buttons or fillable fields related to a consumer's personal, financial, and employment information. In block 322, the consumer can input information in response to the displayed prompts at the consumer mobile device 120. For example, when prompted, the consumer can create an account and input certain identification information to the instant issuance module 228 of the mobile commerce application program 116, such as a name, home address, social security number or other personal identification information, mobile telephone number, email or messaging address, work history, salary and/or other financial asset information.

In block 324, the consumer mobile device 120 can receive from the consumer a request to submit the credit application for processing. For example, once the consumer has input the information needed to apply for the credit card, the consumer can submit the application by manually selecting an icon or radio button displayed on the I/O interface 142 of the consumer mobile device 120 and associated with submitting the application by the instant issuance module 228 of the mobile commerce application program 116. In block 326, the credit application can be transmitted from the consumer mobile device 120 to the server 106 and/or the financial institution system 124 for processing. For example, the instant issuance module 228 can transmit the credit application to the merchant system 112, a financial institution system 124 (e.g., a credit card issuing bank), the server transaction processing system 106, or another third-party processor either directly or via the server transaction processing system 106 where the credit application is processed.

A determination can then be made by the merchant, financial institution, or other third-party processor as to whether to approve the application in block 328. For example, this determination can be made by the credit card application processing program 155 of the financial institution system 124 or other similar system. If the application is not approved, a NO branch can be followed to block 342, where the server 106 can receive notification of denial. For example, the server 106 can receive the notification via the network 126 at the mobile commerce application program 102. In block 344, the server 106 can transmit notification of the denial to the consumer mobile device 120. For example, the mobile commerce application program 102 can transmit the notification of denial of the credit application via the network 126 to the instant issuance module 228 of the mobile commerce application program 116 at the consumer mobile device 120. The notification of denial can be displayed on the consumer mobile device 120 in block 346. The generation of the display can be completed by the mobile commerce application program 116, such as by the instant issuance module 228. The process then proceeds to the END block.

Returning to the credit application approval at block 328, if the consumer's credit application is approved, the YES branch is followed to block 330, where the server 106 can receive notification that the credit application was approved and receives the credit card account information. In certain example embodiments, the determination of approval or denial of the credit application should typically take less than one minute from the time the consumer submits the application. Further, the determination of approval or denial of the credit application will preferably take less than thirty seconds and more preferably less than five seconds from the time the consumer submits the application.

In certain example embodiments, the credit card account information may include the name of the person associated with the account, the account number, the number that will be on the credit card (when supplied), the security code that will be on the credit card, and/or the expiration date for the credit card. In addition, the information may include a bar code, QR code or other type of one-dimensional or two-dimensional code that, when scanned, can provide all or a portion of the credit card account information. In addition, the server 106 can generate an authorization token or mPIN. Furthermore, the server 106 can retrieve any coupons, discounts, and/or promotions associated with applying for the credit card from the merchant system 112 or the mobile commerce application programs 102 or 108.

In block 332, the notification of approval, the credit card account information, the authorization token or mPIN, and/or the coupon, discount, and/or promotional information can be transmitted to the consumer mobile device 120. For example, the notification of approval, the credit card account information, the authorization token or mPIN, and/or discount, coupon, and/or promotional information can be transmitted to the instant issuance module 228 of the mobile commerce application program 116 on the consumer mobile device 120. The consumer is immediately able to use the newly issued credit card and coupon, discount, or promotion for purchases. In block 334, the credit card account information and/or the authorization token or mPIN associated with the credit card account information can be stored on the consumer mobile device 120. For example, the credit card account information can be stored in a database associated with the server 106 and can be associated with the authorization token or mPIN by the server 106. The authorization token or mPIN and identifying information about the credit card (such as the name of the card) can be stored in memory 118 of the consumer mobile device 120 for access by the mobile commerce application program 116 as one of the optional payment methods provided to the consumer on the consumer mobile device 120.

In block 336, the notification of approval or the credit card application is displayed at the I/O interface 142 of the consumer mobile device 120. The display may also include the credit card account information and the discount, coupon, or promotional information. If desired, the consumer is able to immediately use the newly issued credit card to make the current purchase at the merchant and apply any received discount, coupon, or promotion towards the current purchase. For example, in block 338, the payment method, and optionally the discount, coupon, or promotional information, can be transmitted from the consumer's mobile device 120 to the merchant's POS device 112 or 136. In one example, the information is transmitted from the mobile device 120 to the merchant POS device 112 or 136 via near-field communication. In another example embodiment, the information is transmitted by the instant issuance module 228 generating and displaying a code, such as a QR code, bar code, or other type of code on the display of the consumer mobile device 120. The code can then be scanned or entered at the merchant POS device 112 or 136, which is able to determine the necessary credit card information and/or discount, coupon, or promotional information via the code. In another alternative embodiment, the credit card information and/or discount, coupon, or promotional information can be transmitted by the mobile commerce application program 116 at the consumer mobile device 120 through the network 126 and optionally through the server 106 to the client POS device 112 or 136. In block 340, the discount, coupon, or promotional offer is applied by the merchant POS device 112 or 136 to the purchase. The process continues to the END block.

FIG. 4 is a flow chart illustrating another example method for implementing mobile commerce to improve the speed of approving, activating, and implementing a customer credit account for a merchant according to certain example embodiments of the disclosure. Referring now to FIGS. 1, 2, and 4, the example method 400 can begin at block 402 with the consumer selecting one or more products for purchase at a merchant location and proceeding to an area for check-out and payment. In block 404, the consumer mobile device 120 can receive a scan of a QR code, bar code or any other type of one-dimensional or two-dimensional code. For example, the consumer can use the I/O interface 142, such as the camera, of the mobile device 120 to scan the code, which can be located near a merchant POS device 112 or 136 or at another part of the merchant location. In block 406, via the scan of the QR code at the consumer mobile device 120, the application program 116 can access the instant issuance module 228 and display an offer to apply for a credit card associated with the merchant and receive a discount at the consumer mobile device 120.

In block 408, the consumer mobile device 120 can receive a selection to obtain the offer. For example, the consumer can input via the I/O interface 142 of the consumer mobile device 120 an acceptance of the offer by depressing the portion of the touch-screen display of the consumer mobile device 120 provided with an "accept" radio button. In block 410, the selection or request for the offer can be transmitted from the consumer mobile device 120 to the server 106 via the network 126. The server 106 can receive the request in block 412 and transmit from the server 106 to the consumer mobile device 120 access to an application associated with the offer. For example, the server 106, via the mobile commerce application program 102, can provide the instant issuance module 228, or access thereto, for downloading at the mobile commerce application program 116 of the mobile device 120. In block 414, the server 106, such as the mobile commerce application program 102, can receive a request to download the credit card application associated with the offer from the instant issuance module 228 of the mobile commerce application program 116 of the consumer mobile device 120.

In block 416, the server 106 can transmit the credit card application associated with the offer to the consumer mobile device 120 via the network 126. For example, the server 106 can identify the merchant's mobile payment program and instant issuance module 228, and download, via the network 126, the instant issuance module 228 to the consumer mobile device 120 or other client device. In certain example embodiments, the server 106 identifies the instant issuance module 228 for the particular merchant based on the identified location of the consumer mobile device 120, as provided by the location service 144, the code (e.g., QR code, bar code, alphanumeric code or any other one or two-dimensional code) displayed at the merchant, or the information provided by near-field communication.

The downloadable credit card application is received at the consumer mobile device 120 via the mobile commerce application program 116 in block 418. For example, the instant issuance module 228 can be received and stored in memory 118 of the mobile device 120. In block 420, a request can be received to open the mobile commerce application program 116 at the mobile device 120. In certain example embodiments, the request can be automatic in response to completing the download. Alternatively, the consumer can receive a display of an icon associated with the mobile commerce application program 116 and can select the icon on the I/O interface 142 to launch or open the mobile commerce application program 116. In block 422, credit application prompts are presented on the consumer mobile device 120 by the mobile commerce application program 116. For example, the instant issuance module 228 of the mobile commerce application program 116 can generate and display on the consumer mobile device 120 one or more prompts associated with applying for a credit card or similar product. These prompts can include, for example, radio buttons or fillable fields related to a consumer's personal, financial, and employment information. In block 424, the consumer can input information in response to the displayed prompts at the consumer mobile device 120. For example, when prompted, the consumer can create an account and input certain identification information to the instant issuance module 228 of the mobile commerce application program 116, such as a name, home address, social security number or other personal identification information, mobile telephone number, email or messaging address, work history, salary and/or other financial asset information.

In block 426, the consumer mobile device 120 can receive from the consumer a request to submit the credit application for processing. For example, once the consumer has input the information needed to apply for the credit card, the consumer can submit the application by manually selecting an icon or radio button displayed on the I/O interface 142 of the consumer mobile device 120 and associated with submitting the application by the instant issuance module 228 of the mobile commerce application program 116. In block 428, the credit application can be transmitted from the consumer mobile device 120 to the server 106 and/or the financial institution system 124 for processing. For example, the instant issuance module 228 can transmit the credit application to the merchant system 112, a financial institution system 124 (e.g., a credit card issuing bank), the server transaction processing system 106, or another third-party processor either directly or via the server transaction processing system 106 where the credit application is processed.

A determination can then be made by the merchant, financial institution, or other third-party processor as to whether to approve the application in block 430. For example, this determination can be made by the credit card application processing program 155 of the financial institution system 124 or other similar system. If the application is not approved, a NO branch can be followed to block 444, where the server 106 can receive notification of denial. For example, the server 106 can receive the notification via the network 126 at the mobile commerce application program 102. In block 446, the server 106 can transmit notification of the denial to the consumer mobile device 120. For example, the mobile commerce application program 102 can transmit the notification of denial of the credit application via the network 126 to the instant issuance module 228 of the mobile commerce application program 116 at the consumer mobile device 120. The notification of denial can be displayed on the consumer mobile device 120 in block 448. The generation of the display can be completed by the mobile commerce application program 116, such as by the instant issuance module 228. The process then proceeds to the END block.

Returning to the credit application approval at block 430, if the consumer's credit application is approved, the YES branch is followed to block 432, where the server 106 can receive notification that the credit application was approved and receives the credit card account information. In certain example embodiments, the determination of approval or denial of the credit application should typically take less than one minute from the time the consumer submits the application. Further, the determination of approval or denial of the credit application will preferably take less than thirty seconds and more preferably less than five seconds from the time the consumer submits the application.

In certain example embodiments, the credit card account information may include the name of the person associated with the account, the account number, the number that will be on the credit card (when supplied), the security code that will be on the credit card, and/or the expiration date for the credit card. In addition, the information may include a bar code, QR code or other type of one-dimensional or two-dimensional code that, when scanned, can provide all or a portion of the credit card account information. In addition, the server 106 can generate an authorization token or mPIN. Furthermore, the server 106 can retrieve any coupons, discounts, and/or promotions associated with applying for the credit card from the merchant system 112 or the mobile commerce application programs 102 or 108.

In block 434, the notification of approval, the credit card account information, the authorization token or mPIN, and/or the coupon, discount, and/or promotional information can be transmitted to the consumer mobile device 120. For example, the notification of approval, the credit card account information, the authorization token or mPIN, and/or discount, coupon, and/or promotional information can be transmitted to the instant issuance module 228 of the mobile commerce application program 116 on the consumer mobile device 120. The consumer is immediately able to use the newly issued credit card and coupon, discount, or promotion for purchases. In block 436, the credit card account information and/or the authorization token or mPIN associated with the credit card account information can be stored on the consumer mobile device 120. For example, the credit card account information can be stored in a database associated with the server 106 and can be associated with the authorization token or mPIN by the server 106. The authorization token or mPIN and identifying information about the credit card (such as the name of the card) can be stored in memory 118 of the consumer mobile device 120 for access by the mobile commerce application program 116 as one of the optional payment methods provided to the consumer on the consumer mobile device 120.

In block 438, the notification of approval of the credit card application is displayed at the I/O interface 142 of the consumer mobile device 120. The display may also include the credit card account information and the discount, coupon, or promotional information. If desired, the consumer is able to immediately use the newly issued credit card to make the current purchase at the merchant and apply any received discount, coupon, or promotion towards the current purchase. For example, in block 440, the payment method, and optionally the discount, coupon, or promotional information, can be transmitted from the consumer's mobile device 120 to the merchant's POS device 112 or 136. In one example, the information is transmitted from the mobile device 120 to the merchant POS device 112 or 136 via near-field communication. In another example embodiment, the information is transmitted by the instant issuance module 228 generating and displaying a code, such as a QR code, bar code, or other type of code on the display of the consumer mobile device 120. The code can then be scanned or entered at the merchant POS device 112 or 136, which is able to determine the necessary credit card information and/or discount, coupon, or promotional information via the code. In another alternative embodiment, the credit card information and/or discount, coupon, or promotional information can be transmitted by the mobile commerce application program 116 at the consumer mobile device 120 through the network 126 and optionally through the server 106 to the client POS device 112 or 136. In block 442, the discount, coupon, or promotional offer is applied by the merchant POS device 112 or 136 to the purchase. The process continues to the END block.

FIG. 5 is a flow chart illustrating yet another example method for implementing mobile commerce to improve the speed of approving, activating, and implementing a customer credit account for a merchant according to certain example embodiments of the disclosure. Referring now to FIGS. 1, 2, and 5, the example method 500 can begin at block 502 with the consumer selecting one or more products for purchase at a merchant location and proceeding to an area for check-out and payment. In block 504, an indication can be received at, for example, a location service 132 of the merchant device 136, such as a NFC pad, that the consumer mobile device 120 is within a predetermined distance of the merchant NFC device 136. In certain exemplary embodiments, the distance is less than five feet and preferably less than one foot from the NFC device 136. For example, the NFC device 136 can sense the location service 144 of the consumer mobile device 120 or vice versa. In block 506, via the scan of the NFC device 136, the application program 116 can access the instant issuance module 228 and display an offer to apply for a credit card associated with the merchant and receive a discount at the I/O interface 142 (e.g., display) of the consumer mobile device 120.

In block 508, the consumer mobile device 120 can receive a selection to obtain the offer. For example, the consumer can input via the I/O interface 142 of the consumer mobile device 120 an acceptance of the offer by depressing the portion of the touch-screen display of the consumer mobile device 120 provided with an "accept" radio button. In block 510, the selection or request for the offer can be transmitted from the consumer mobile device 120 to the server 106 via the network 126. The server 106 can receive the request in block 512 and transmit from the server 106 to the consumer mobile device 120 access to an application associated with the offer. For example, the server 106, via the mobile commerce application program 102, can provide the instant issuance module 228, or access thereto, for downloading at the mobile commerce application program 116 of the mobile device 120. In block 514, the server 106, such as the mobile commerce application program 102, can receive a request to download the credit card application associated with the offer from the instant issuance module 228 of the mobile commerce application program 116 of the consumer mobile device 120.

In block 516, the server 106 can transmit the credit card application associated with the offer to the consumer mobile device 120 via the network 126. For example, the server 106 can identify the merchant's mobile payment program and instant issuance module 228, and download, via the network 126, the instant issuance module 228 to the consumer mobile device 120 or other client device. In certain example embodiments, the server 106 identifies the instant issuance module 228 for the particular merchant based on the identified location of the consumer mobile device 120, as provided by the location service 144, the code (e.g., QR code, bar code, alphanumeric code or any other one or two-dimensional code) displayed at the merchant, or the information provided by near-field communication.

The downloadable credit card application is received at the consumer mobile device 120 via the mobile commerce application program 116 in block 518. For example, the instant issuance module 228 can be received and stored in memory 118 of the mobile device 120. In block 520, a request can be received to open the mobile commerce application program 116 at the mobile device 120. In certain example embodiments, the request can be automatic in response to completing the download. Alternatively, the consumer can receive a display of an icon associated with the mobile commerce application program 116 and can select the icon on the I/O interface 142 to launch or open the mobile commerce application program 116. In block 522, credit application prompts are presented on the consumer mobile device 120 by the mobile commerce application program 116. For example, the instant issuance module 228 of the mobile commerce application program 116 can generate and display on the consumer mobile device 120 one or more prompts associated with applying for a credit card or similar product. These prompts can include, for example, radio buttons or fillable fields related to a consumer's personal, financial, and employment information. In block 524, the consumer can input information in response to the displayed prompts at the consumer mobile device 120. For example, when prompted, the consumer can create an account and input certain identification information to the instant issuance module 228 of the mobile commerce application program 116, such as a name, home address, social security number or other personal identification information, mobile telephone number, email or messaging address, work history, salary and/or other financial asset information.

In block 526, the consumer mobile device 120 can receive from the consumer a request to submit the credit application for processing. For example, once the consumer has input the information needed to apply for the credit card, the consumer can submit the application by manually selecting an icon or radio button displayed on the I/O interface 142 of the consumer mobile device 120 and associated with submitting the application by the instant issuance module 228 of the mobile commerce application program 116. In block 528, the credit application can be transmitted from the consumer mobile device 120 to the server 106 and/or the financial institution system 124 for processing. For example, the instant issuance module 228 can transmit the credit application to the merchant system 112, a financial institution system 124 (e.g., a credit card issuing bank), the server transaction processing system 106, or another third-party processor either directly or via the server transaction processing system 106 where the credit application is processed.

A determination can then be made by the merchant, financial institution, or other third-party processor as to whether to approve the application in block 530. For example, this determination can be made by the credit card application processing program 155 of the financial institution system 124 or other similar system. If the application is not approved, a NO branch can be followed to block 544, where the server 106 can receive notification of denial. For example, the server 106 can receive the notification via the network 126 at the mobile commerce application program 102. In block 546, the server 106 can transmit notification of the denial to the consumer mobile device 120. For example, the mobile commerce application program 102 can transmit the notification of denial of the credit application via the network 126 to the instant issuance module 228 of the mobile commerce application program 116 at the consumer mobile device 120. The notification of denial can be displayed on the consumer mobile device 120 in block 548. The generation of the display can be completed by the mobile commerce application program 116, such as by the instant issuance module 228. The process then proceeds to the END block.

Returning to the credit application approval at block 530, if the consumer's credit application is approved, the YES branch is followed to block 532, where the server 106 can receive notification that the credit application was approved and receives the credit card account information. In certain example embodiments, the determination of approval or denial of the credit application should typically take less than one minute from the time the consumer submits the application. Further, the determination of approval or denial of the credit application will preferably take less than thirty seconds and more preferably less than five seconds from the time the consumer submits the application.

In certain example embodiments, the credit card account information may include the name of the person associated with the account, the account number, the number that will be on the credit card (when supplied), the security code that will be on the credit card, and/or the expiration date for the credit card. In addition, the information may include a bar code, QR code or other type of one-dimensional or two-dimensional code that, when scanned, can provide all or a portion of the credit card account information. In addition, the server 106 can generate an authorization token or mPIN. Furthermore, the server 106 can retrieve any coupons, discounts, and/or promotions associated with applying for the credit card from the merchant system 112 or the mobile commerce application program 102 or 108.

In block 534, the notification of approval, the credit card account information, the authorization token or mPIN, and/or the coupon, discount, and/or promotional information can be transmitted to the consumer mobile device 120. For example, the notification of approval, the credit card account information, the authorization token or mPIN, and/or discount, coupon, and/or promotional information can be transmitted to the instant issuance module 228 of the mobile commerce application program 116 on the consumer mobile device 120. The consumer is immediately able to use the newly issued credit card and coupon, discount, or promotion for purchases. In block 536, the credit card account information and/or the authorization token or mPIN associated with the credit card account information can be stored on the consumer mobile device 120. For example, the credit card account information can be stored in a database associated with the server 106 and can be associated with the authorization token or mPIN by the server 106. The authorization token or mPIN and identifying information about the credit card (such as the name of the card) can be stored in memory 118 of the consumer mobile device 120 for access by the mobile commerce application program 116 as one of the optional payment methods provided to the consumer on the consumer mobile device 120.

In block 538, the notification of approval of the credit card application is displayed at the I/O interface 142 of the consumer mobile device 120. The display may also include the credit card account information and the discount, coupon, or promotional information. If desired, the consumer is able to immediately use the newly issued credit card to make the current purchase at the merchant and apply any received discount, coupon, or promotion towards the current purchase. For example, in block 540, the payment method, and optionally the discount, coupon, or promotional information, can be transmitted from the consumer's mobile device 120 to the merchant's POS device 112 or 136. In one example, the information is transmitted from the mobile device 120 to the merchant POS device 112 or 136 via near-field communication. In another example embodiment, the information is transmitted by the instant issuance module 228 generating and displaying a code, such as a QR code, bar code, or other type of code on the display of the consumer mobile device 120. The code can then be scanned or entered at the merchant POS device 112 or 136, which is able to determine the necessary credit card information and/or discount, coupon, or promotional information via the code. In another alternative embodiment, the credit card information and/or discount, coupon, or promotional information can be transmitted by the mobile commerce application program 116 at the consumer mobile device 120 through the network 126 and optionally through the server 106 to the client POS device 112 or 136. In block 542, the discount, coupon, or promotional offer is applied by the merchant POS device 112 or 136 to the purchase. The process continues to the END block.

Figure 6:
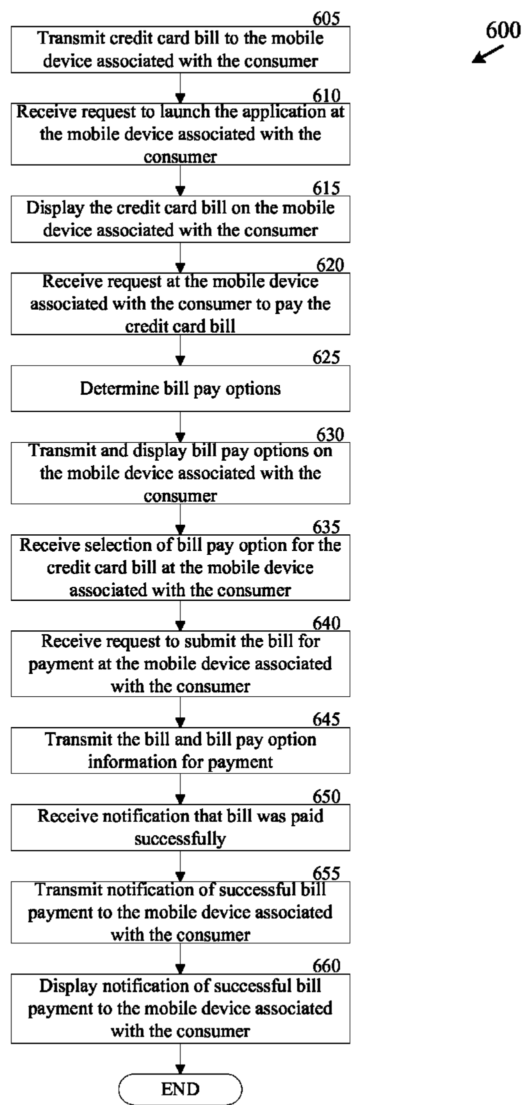
FIG. 6 is a flow chart illustrating an example method for implementing mobile commerce to receive and pay a credit card bill according to certain example embodiments of the disclosure.

Using some or all of the above systems and processes, a technical solution for providing a credit application, approving a credit application and providing virtually immediate access and use of a new credit account and any discounts or promotions associated with the new credit account in response to the received credit application can be enabled. In certain embodiments, technical solutions for approving the account, such as providing new credit account information to a mobile device and providing mechanisms for immediate use of the new credit account can be implemented In addition, as the consumer continues to use the newly issued credit card, bills can be electronically transmitted to the consumer via the consumer's email address or the mobile commerce application program 116. FIG. 6 is a flow chart illustrating an example method for implementing mobile commerce to receive and pay a credit card bill according to certain example embodiments of the disclosure. Referring now to FIGS. 1, 2, and 6, the example process 600 can begin at block 605, where the credit card bill is transmitted to the consumer mobile device 120. For example, the merchant system 112 or financial institution system 124 or another third party system can transmit the credit card bill via the network 126 to the consumer at the mobile device 120 by way of an email address or directly to the mobile commerce application program 116. In block 610, the consumer mobile device 120 can receive a request to launch the mobile commerce application program 116. This request can be by the consumer using the I/O interface 142 by selecting (e.g., depressing the display screen) an icon associated with the mobile commerce application program 116. Alternatively, the mobile commerce application program 116 can launch automatically in response to receiving the bill or notification of the bill via the server transaction processing system 106 and provide a notification via the I/O interface 142 of the consumer mobile device 120 that a bill has been received.

In block 615, the credit card bill can be displayed on the consumer mobile device 120. For example, the bill can be displayed on the screen via the bill payment module 224 of the mobile commerce application program 116 at the mobile device 120. In block 620, the consumer mobile device 120 can receive a request to pay the credit card bill. For example, the consumer can electronically pay the credit card bill by accessing the bill payment module 224 of the mobile commerce application program 116. In blocks 625-630, bill payment options are determined and displayed on the display of the consumer mobile device 120. For example, the bill payment module 224 may determine the payment methods (or authorization tokens or mPINs associated with the payment methods that are stored in memory 118 of the consumer mobile device 120 or the bill payment module 224 may request the payment methods for the consumer from the mobile commerce application program 102 at the server transaction processing system 106 and receive and display those payment options.

In block 635, the consumer mobile device 120 receives a selection of the bill payment option. For example, the selection can be received by a consumer selecting one of the provided options or alternatively inputting information related to a non-stored payment method for use in paying the bill. For example, the stored and non-stored payment methods include, but are not limited to, a different credit card or a checking or savings account number. The selection can be at the I/O interface 142 and the selection can be identified by the bill payment module 224 of the mobile commerce application program 116. In block 645, the consumer can then submit the bill for payment. For example, the bill payment module 224 at the consumer mobile device 120 can present a selection on the display to submit the bill for payment that the consumer can initiate by touching or otherwise selecting on the display via the I/O interface 142.

In block 645, the bill and selected bill payment option can be transmitted for payment. For example, the bill and payment method (or authorization token or mPIN for the selected payment method) can be transmitted from the consumer mobile device 120 by the bill payment module 224 of the mobile commerce application program 116 to the mobile commerce application program 102 at the server transaction processing system 106 or to the mobile commerce application program 108 of the merchant system 112. At the server system 106, the token or mPIN can be associated with the details of the selected payment method by the mobile commerce application program 102 and can be forwarded by the program 102 on with the bill to the merchant system 112 or financial institution system 124 (e.g., credit card issuing bank) or other payment system. In block 650, notification can be received that the bill was paid successfully at the mobile commerce application program 102 of the server transaction processing system 106. The notification can be transmitted by the mobile commerce application program 102 from the server transaction processing system 106 to the bill payment module 224 of the mobile commerce application program 116 at the consumer mobile device 120 in block 655. For example, the mobile commerce application program 102 can transmit the notification to the bill payment module 224 of the consumer mobile device 120. Alternatively, notification of payment of the bill can be transmitted by the mobile commerce application program 102 to the consumer by email or text message. In block 660, the notification of payment is displayed on the consumer mobile device 120. For example, the bill payment module 224 of the mobile commerce application program 116 can receive and display the notification on the display of the consumer mobile device 120.

Using some or all of the above systems and processes, a technical solution for providing bill payment functionality via a mobile device is provided. In certain embodiments, technical solutions for providing an electronic version of a credit card bill on a mobile device, providing payment options via a mobile application on the mobile device and facilitating payment of the credit card bill via the mobile application on the mobile device can be implemented The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to example embodiments. It will be understood that one or more blocks of the block diagrams and blocks of the flow diagrams, and combinations of blocks in the block diagrams and blocks of the flow diagrams, respectively, may be implemented by execution of computer-executable program instructions. Likewise, some blocks of the block diagrams and blocks of the flow diagrams may not necessarily need to be performed in the order presented, or may not necessarily need to be performed at all, according to some embodiments. Further, additional components and/or operations beyond those depicted in blocks of the block and/or blocks of the flow diagrams may be present in certain embodiments.

Accordingly, blocks of the block diagrams and blocks of the flow diagrams support combinations of means for performing the specified functions, combinations of elements or steps for performing the specified functions and program instruction means for performing the specified functions. It will also be understood that each block of the block diagrams and block of the flow diagrams, and combinations of blocks in the block diagrams and blocks of the flow diagrams, may be implemented by special-purpose, hardware-based computer systems that perform the specified functions, elements or steps, or combinations of special-purpose hardware and computer instructions.

The computer-executable program instructions described herein may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Conditional language, such as, among others, “can,” “could,” “might,” or “may,” unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer-implemented method comprising:

receiving, by a consumer mobile device comprising one or more processors, an application for a credit account;

inputting, by the consumer mobile device, a plurality of data inputs in the application for the credit account;

transmitting, by the consumer mobile device, the application for the credit account comprising the data inputs to an application processing server to facilitate processing of the application;

receiving, by the consumer mobile device, a notification of approval of the application for the credit account;

receiving, by the consumer mobile device, a credit account information comprising a credit account number associated with the approved application for the credit account while the consumer is in the predefined merchant location; and storing, by the consumer mobile device, the credit account information for use as at least one payment method accessible by the consumer mobile device.

2. The computer-implemented method of claim 1, further comprising receiving, by the consumer mobile device, a credit card account authorization token.

3. The computer-implemented method of claim 2, further comprising:

associating, by the consumer mobile device, the credit card account authorization token with the credit account information; and storing, by the consumer mobile device, the credit card account authorization token with the associated credit account information for use as at least one payment method accessible by the consumer mobile device.

4. The computer-implemented method of claim 1, wherein the credit account information is stored in memory on the consumer mobile device.

5. The computer-implemented method of claim 1, wherein the credit account information is stored in a database remotely located from the consumer mobile device and remotely accessible by the consumer mobile device.

6. The computer-implemented method of claim 1, further comprising:

receiving, by the consumer mobile device, a personal identification number code;

associating, by the consumer mobile device, the personal identification number code with the credit card account information; and storing, by the consumer mobile device, the personal identification number code with the associated credit account information for use as at least one payment method accessible by the consumer mobile device.

7. The computer-implemented method of claim 1, further comprising:

selecting, by the consumer mobile device, at least a portion of the credit account information as a payment method for a purchase at the merchant location; and transmitting, by the consumer mobile device, the at least the portion of the credit account information to a merchant system to facilitate the purchase at the merchant location.

8. The computer-implemented method of claim 7, further comprising:

receiving, by the consumer mobile device, a coupon associated with the receipt of the credit account information; and transmitting, by the consumer mobile device, the coupon to the merchant system to facilitate the application of the coupon to the purchase at the merchant location.

9. The computer-implemented method of claim 1, further comprising;

scanning, by the consumer mobile device, a code at the merchant location, wherein the code is one of a bar code and a QR code;

receiving, by the consumer mobile device, an offer to apply for the credit account in response to scanning the code; and transmitting, by the consumer mobile device, a request to receive the offer to apply for the credit account, wherein the application for the credit account is received in response to the transmission of the request.

10. The computer-implemented method of claim 1, further comprising:

positioning the consumer mobile device adjacent a near-field communication device; and receiving, by the consumer mobile device, an offer to apply for the credit account from the near-field communication device.

11. A system for a consumer mobile device, the system comprising:

at least one memory storing computer-executable instructions; and at least one processor, wherein the at least one processor is configured to access the at least one memory and to execute the computer-executable instructions to:

receive an application for a credit account;

input a plurality of data inputs in the application for the credit account;

direct communication of the application for the credit account comprising the data inputs to an application processing server to facilitate processing of the application;

receive a notification of approval of the application for the credit account;

receive a credit account information comprising a credit account number associated with the approved application for the credit account while the consumer is in the predefined merchant location; and store the credit account information for use as at least one payment method accessible by the consumer mobile device.

12. The system of claim 11, wherein the at least one processor is further configured to execute the computer-executable instructions to receive a credit card account authorization token.

13. The system of claim 12, wherein the at least one processor is further configured to execute the computer-executable instructions to:

associate the credit card account authorization token with the credit account information; and store the credit card account authorization token with the associated credit account information for use as at least one payment method accessible by the consumer mobile device.

14. The system of claim 11, wherein the credit account information is stored in memory on the consumer mobile device.

15. The system of claim 11, wherein the credit account information is stored in a database remotely located from the consumer mobile device and remotely accessible by the consumer mobile device.

16. The system of claim 11, wherein the at least one processor is further configured to execute the computer-executable instructions to:

receive a personal identification number code;

associate the personal identification number code with the credit card account information; and store the personal identification number code with the associated credit account information for use as at least one payment method accessible by the consumer mobile device.

17. The system of claim 11, wherein the at least one processor is further configured to execute the computer-executable instructions to:

select at least a portion of the credit account information as a payment method for a purchase at the merchant location; and direct communication of the at least the portion of the credit account information to a merchant system to facilitate the purchase at the merchant location.

18. The system of claim 17, wherein the at least one processor is further configured to execute the computer-executable instructions to:

receive a coupon associated with the receipt of the credit account information; and direct communication of the coupon to the merchant system to facilitate the application of the coupon to the purchase at the merchant location.

19. The system of claim 11, wherein the at least one processor is further configured to execute the computer-executable instructions to:

scan a code at the merchant location, wherein the code is one of a bar code and a QR code;

receive an offer to apply for the credit account in response to scanning the code; and direct communication of a request to receive the offer to apply for the credit account, wherein the application for the credit account is received in response to the transmission of the request.

20. The system of claim 11, wherein the at least one processor is further configured to execute the computer-executable instructions to receive, in response to positioning the consumer mobile device adjacent a near-field communication device, an offer to apply for the credit account from the near-field communication device.

* * * * *